United States Patent
Van Brocklin et al.

(10) Patent No.: US 7,315,493 B2
(45) Date of Patent: Jan. 1, 2008

(54) APPARATUS AND METHOD FOR CALIBRATING A LASER IMAGIBLE APPARATUS

(75) Inventors: Andrew L. Van Brocklin, Corvallis, OR (US); Daryl E. Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 741 days.

(21) Appl. No.: 10/767,192

(22) Filed: Jan. 30, 2004

(65) Prior Publication Data

US 2005/0169119 A1    Aug. 4, 2005

(51) Int. Cl.
*G11B 7/00* (2006.01)

(52) U.S. Cl. .............................. 369/44.29; 369/30.27; 369/53.25

(58) Field of Classification Search .............. 369/44.29
See application file for complete search history.

(56) References Cited

U.S. PATENT DOCUMENTS

| | | | |
|---|---|---|---|
| 4,967,404 A | 10/1990 | Orlicki et al. | |
| 6,714,719 B1 * | 3/2004 | Okumura | 386/46 |
| 6,873,489 B2 * | 3/2005 | Ho et al. | 360/78.05 |
| 2002/0191517 A1 | 12/2002 | Kazuhiko | |
| 2004/0013056 A1 * | 1/2004 | Ando | 369/44.29 |
| 2005/0276177 A1 * | 12/2005 | Nishiuchi | 369/44.29 |

FOREIGN PATENT DOCUMENTS

| | | |
|---|---|---|
| EP | 0388551 | 9/1990 |
| EP | 1308938 | 5/2003 |
| EP | 1367570 | 12/2003 |
| EP | 1385154 | 1/2004 |

OTHER PUBLICATIONS

European Search Report dated May 4, 2006, Documents Considered to be Relevant (1 page).

* cited by examiner

*Primary Examiner*—Wayne Young
*Assistant Examiner*—Vanessa (Brandi) Coleman (57) ABSTRACT

A laser imagible apparatus includes a lens, a media tray, and an adjustment mechanism. The adjustment mechanism is configured to determine a voice coil gain for substantially all locations on a media.

11 Claims, 6 Drawing Sheets

APPARATUS AND METHOD FOR CALIBRATING A LASER IMAGIBLE APPARATUS

BACKGROUND

As a laser (or other light source) and sensing lens are moved radially (by an optical pick-up unit ("OPU")) with respect to a disc in a disc drive, the distance between the surface of the disc and the lens (hereinafter referred to as a Z-distance) is substantially constant. However, various imperfections may arise over the surface of the disc and/or the shape of the disc may vary. For example, the disc may be subject to "potato chipping" (i.e., where the disc bends along a diameter) or "cupping" (i.e., where the outer edge of the disc are generally planar but not coplanar with the center of the disc). Previous methods and apparatuses have addressed these imperfections such that the lens remains substantially at a Z-distance of optimum focus with respect to each portion of the disc. The Z-distance of optimum focus will correspond to the Z-distance at which a maximum amount of data can be written to a disc or read from it. There may, however, be other applications in which the Z-distance of optimum focus may not be ideal. Accordingly, there is a need to know the gain corresponding to optimum focus at each location on a disc.

DETAILED DESCRIPTION

Reference will now be made in detail to various embodiments of the invention, which are illustrated in the drawings. An effort has been made to use the same reference numbers throughout the drawings to refer to the same or like parts.

Typically, a lens is positioned at a Z-distance corresponding to a height at which the disc is in optimum focus. An understanding of the orientation of the Z axis along which the Z-distance offset is adjusted is provided in FIG. 5. The Z-distance of optimum focus may be determined based on a peak in a sum signal returned to the lens, as later described in detail. However, when creating a label designed for readability by the human eye, a Z-distance other than optimum focus may be desired, i.e., defocusing the laser beam may allow better image quality and/or faster printing.

The chemistry used in CD label laser imaging can only handle a maximum light intensity and must be kept above a critical temperature for a period of time. With a laser beam at optimum focus, increasing the laser power allows the print time to speed-up to a point at which the media is damaged by the laser. One solution is to increase the laser power and defocus the beam using a Z-distance offset, so that the system can write a larger spot at one time and, thereby, print faster. For example, the ability to write to a disc may be enhanced when the Z-distance of the lens is slightly offset (e.g., 30 μm) from the Z-distance of optimum focus.

An optimum focus is conventionally defined by an OPU forming the smallest diameter spot on the disk as defined by the spot's full width half maximum ("FWHM"). If 0 μm corresponds to the Z-distance of the lens at optimum focus, a light intensity best for labeling could correspond to an offset between about −80 μm (i.e., toward the disc) and about +20 μm (i.e., away from the disc). In one embodiment, the offset may be about −30 μm, i.e., in the middle of this range. Accordingly, if the Z-distance of optimum labeling focus is about 1.4 mm, the Z-distance of focus offset for labeling would be about 1.4 mm−30 μm=about 1370 μm from the disc.

Figure 1A:
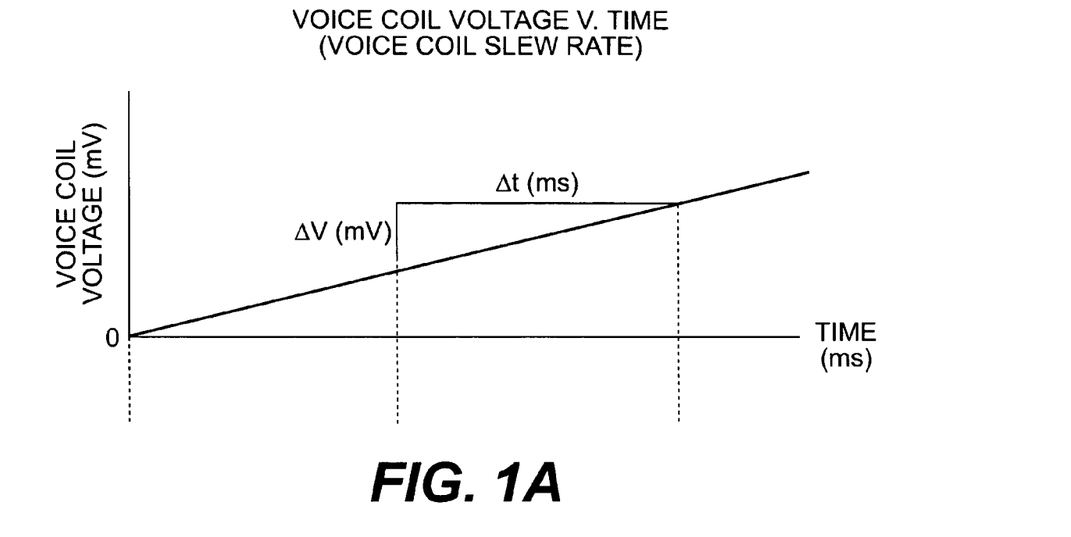
FIG. 1A is a graph of a voice coil applied voltage defined by a changing coil voltage (mV) versus time (ms)
Figure 1B:
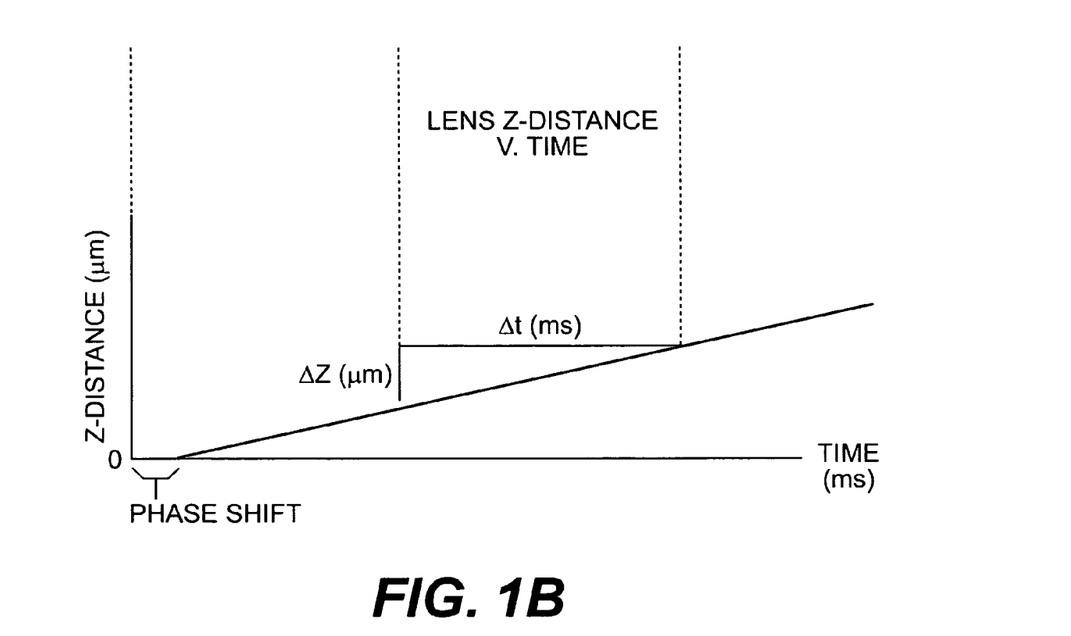
FIG. 1B is graph of the lens Z-distance corresponding to the voice coil applied voltage of FIG. 1A showing the distance (μm) the lens moves versus time (ms)

To achieve this −30 μm offset, the voltage applied to the voice coil (which would otherwise maintain the lens at a predetermined Z-distance, such as the Z-distance of optimum focus) must be changed. The degree to which the voltage must be changed, in turn, depends on the coil gain ("CG") of the voice coil of the CD drive. The coil gain controls the Z-distance of a lens with respect to a disc. With respect to FIGS. 1A and 1B, the voice coil gain for a given change in time Δt (ms), is defined is a change in voltage ΔV (mV) needed to move the lens a certain distance ΔZ (μm), as follows:

$$CG = \Delta Z / \Delta V \qquad \text{eq. 1}$$

When the voltage or current (hereinafter simply referred to as "voltage") supplied to the voice coil is changed, the Z-distance of the lens is correspondingly changed. For example, as shown in FIGS. 1A and 1B, when the voltage supplied to the voice coil increases, the Z-distance of the lens correspondingly increases, usually with a phase shift delay caused by mechanical inertia. However, the change in Z-distance ΔZ for a particular change in voltage ΔV is not readily measurable in conventional optical drives and, therefore, the coil gain can not simply be calculated based on measured change in Z-distance ΔZ and a measured change in voltage ΔV.

However, from equation no. 1, if the coil gain can be determined, a change in voltage ΔV can be calculated to correspond to a desired change in Z-distance ΔZ as follows:

$$\Delta V = \Delta Z / CG \qquad \text{eq. 2}$$

Another complication arises in that the coil gain is subject to change over the surface of the disc. For example, coil gain is most strongly affected by temperature changes as the printing process progresses. Accordingly, although a predetermined offset could be applied to the lens in a conventional CD drive, the result would not be effective due to the varying coil gain. As a result, if the offset is to be effective, the coil gain must be continually evaluated and adjusted in an iterative manner at each location on the disc, so that the correct voltage offset may be applied to obtain the desired Z-distance offset. As a result, an accurate understanding of the coil gain at each location on the disc is needed to set the correct Z-distance offset $\Delta Z$ at each location on the disc.

Figure 2A:
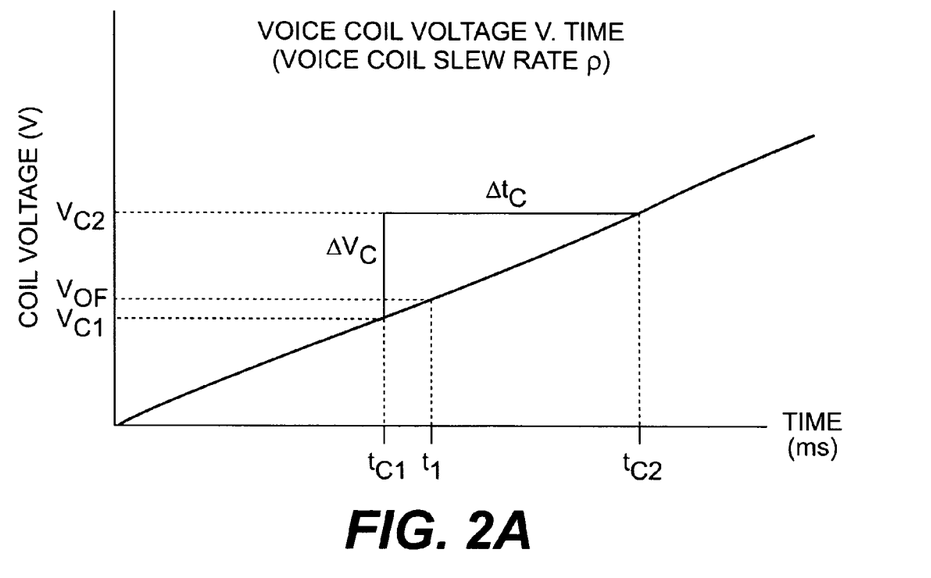
FIG. 2A is a graph of a voice coil slew rate $\rho$ of the type shown in FIG. 1A.
Figure 2B:
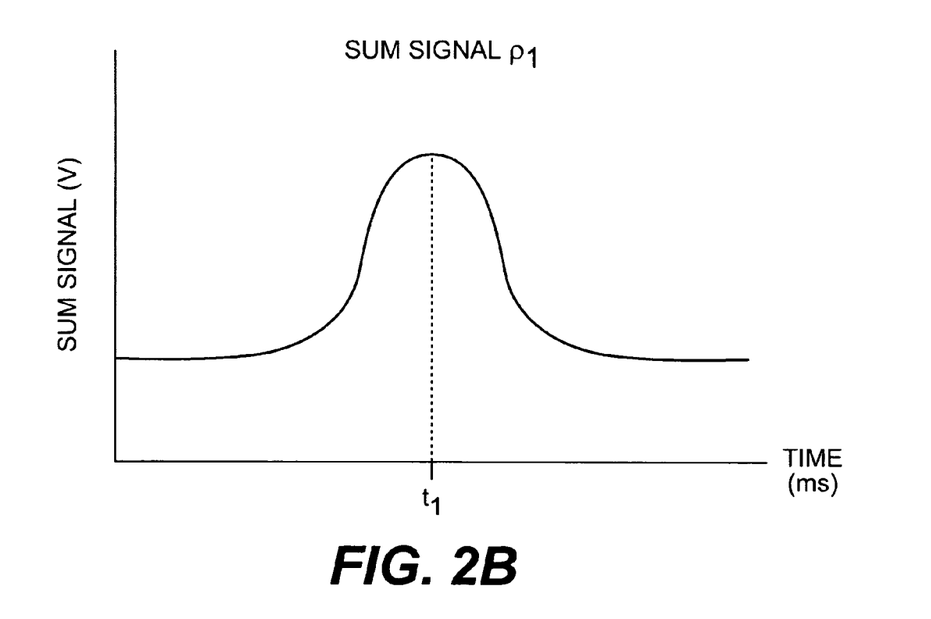
FIG. 2B is a first sum signal $\rho_1$ which corresponds to the voice coil slew rate $\rho$ of FIG. 2A.
Figure 2C:
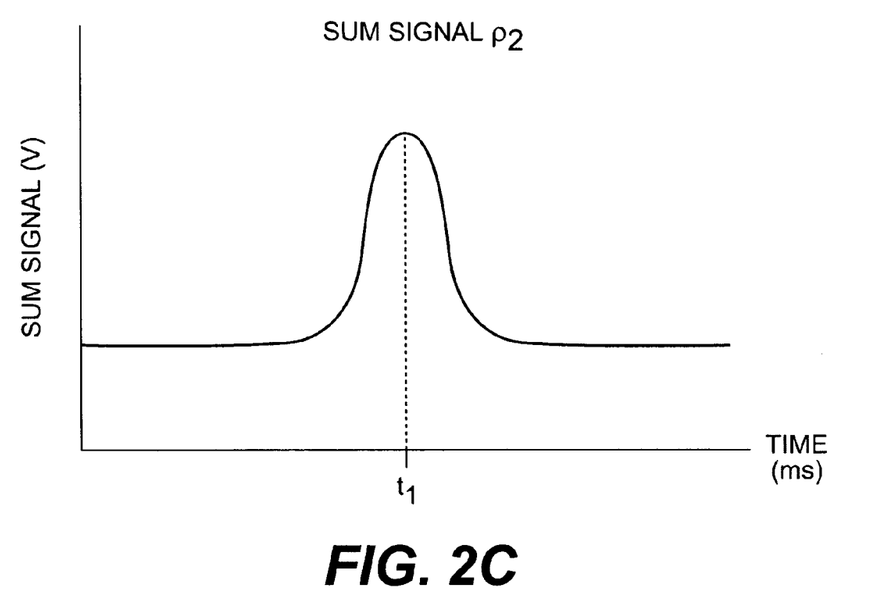
FIG. 2C is a second sum signal $\rho_2$ which corresponds to the voice coil slew rate $\rho$ of FIG. 2A.
Figure 2D:
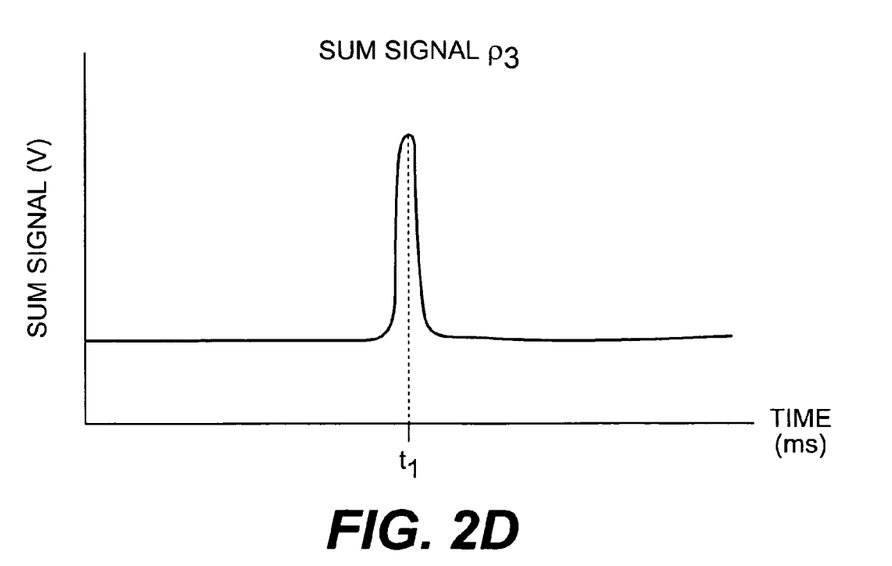
FIG. 2D is a third sum signal $\rho_3$ which corresponds to the voice coil slew rate $\rho$ of FIG. 2A.

As shown in FIGS. 2A-2D, as the coil voltage increases linearly over time (as shown in FIG. 2A) at a constant voice coil slew rate $\rho$, the Z-distance of optimum focus is identified by the peak in the sum signal (as shown in FIGS. 2B-2D) at a time $t_1$. However, for a given scan time, the shape of the peak in the sum signal $\rho_1$, $\rho_2$, $\rho_3$, may vary (as shown) depending on the age of the voice coil motor, sample intervals, the direction of sample (i.e., as the lens moves toward or away from the disc), media type changes in operating temperatures, or other reasons. For this reason, voice coil gain calculations based on the peaks in the sum signal $\rho_1$, $\rho_2$, $\rho_3$, may be averaged, filtered, regressed, etc. to obtain a more accurate coil gain. Moreover, many samples (e.g., 100+) and associated calculations may be averaged, filtered, regressed, etc. to obtain a more accurate coil gain.

It has been determined that the coil gain at a particular location on a disk is related to the sum signal at that location and the input voice coil slew rate. Specifically, the rate of change of voltage in the sum signal in the vicinity of the optimum focus peak for a particular location on a disc defines a sum signal slew rate at that location. The sum signal slew rate can be calculated with the known input voice coil slew rate to yield the coil gain, as hereafter described in detail.

The controlled change in the coil voltage defines an input voice coil slew rate ("VCSR"). Specifically, with respect to FIG. 2A, the VCSR is defined as:

$$VCSR=\Delta V_c/\Delta t_c=(V_{C2}-V_{C1})/(t_{C2}-t_{C1}) \qquad \text{eq. 3}$$

Figure 3:
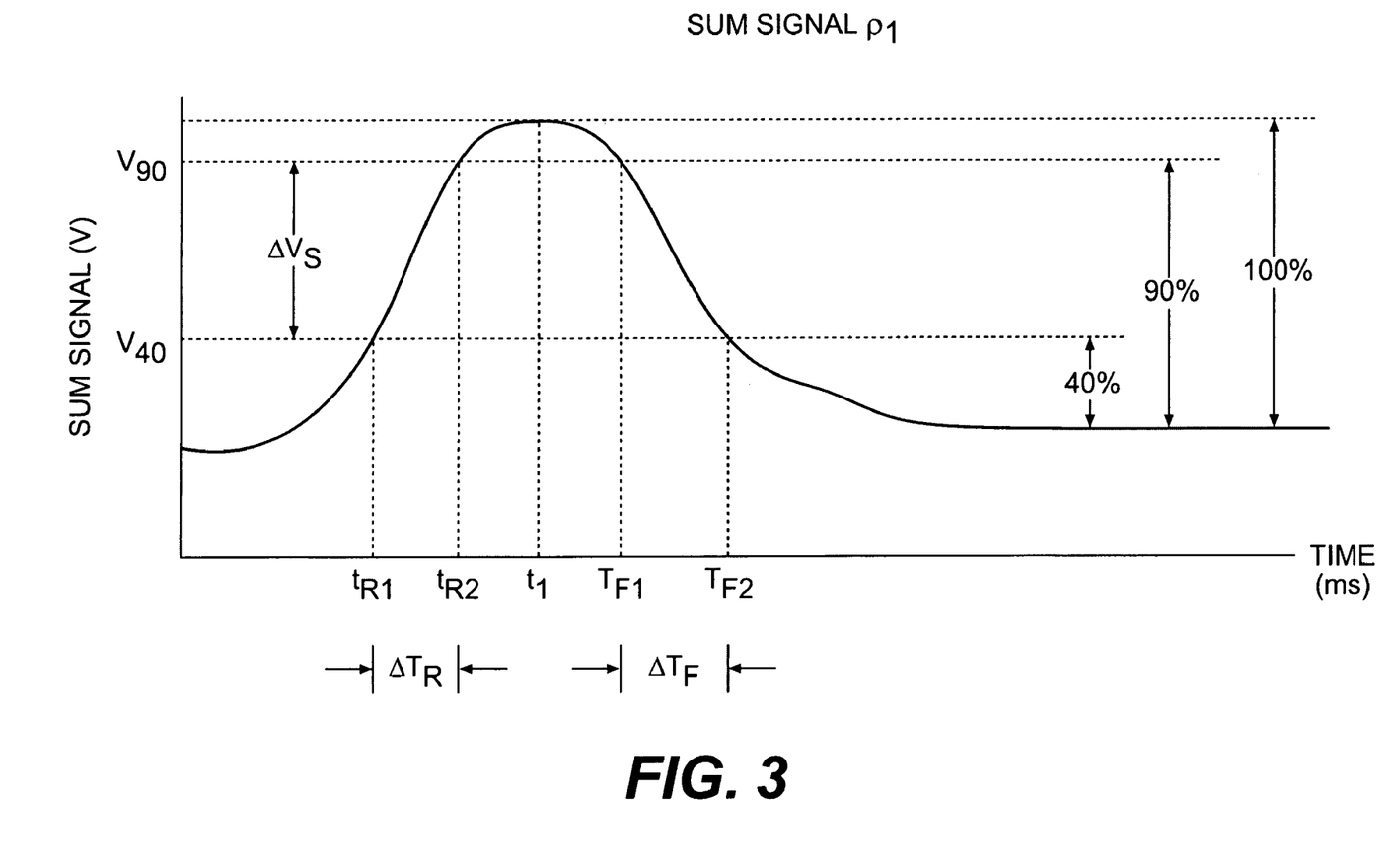
FIG. 3 is a graph of the peak of the second sum signal $\rho_1$ of FIG. 2B.

As shown in FIG. 3 (which is an enlarged view of the sum signal $\rho_1$ of FIG. 2B in the vicinity of the point of optimum focus), a rise time $\Delta t_R$ (or fall time $\Delta t_F$) of the peak can be measured with respect to the change in sum voltage $\Delta Vs_R$ ($\Delta Vs_F$ for $t_F$) which occurs during that time.

For accuracy purposes, it is preferred that a rise time $\Delta t_R$ (or fall time $\Delta t_F$) and associated voltage change $\Delta Vs_R$ ($\Delta Vs_F$ for $\Delta t_F$) are measured between the points in time at which the peak has reached 40% of its peak value and 90% of its peak value, when measured from a baseline value (as shown). The reason for this range limitation is that below 40%, the sum signal is subject to double reflection and above 90% the sum signal is subject to noise which may occur when the surface of the disc approaches optimum focus. Further, although the measurement times are shown as being taken at 40% and 90%, it should be understood that the measurement times may be made anywhere between 40% and 90%. Moreover, as later described, measurements may be taken during both the rise time $\Delta t_R$ (i.e., between 40% and 90%) and the fall time $\Delta t_F$ (i.e., between 90% and 40%) and these measurements may be averaged, filtered, regressed, etc. to yield a more accurate result.

As shown in FIG. 3, a rise time $\Delta t_R$ may be measured between a time $t_{R1}$ at which the peak hits its 40% value and a time $t_{R2}$ at which it hits its 90% value. Similarly, a fall time $\Delta t_F$ may be measured between a time $t_{F1}$ at which the peak hits its 90% value and a time $t_{F2}$ at which it hits its 40% value. As a result:

$$\Delta t_R=t_{R2}-t_{R1} \qquad \text{eq. 4}$$

$$\Delta t_F=t_{F2}-t_{F1} \qquad \text{eq. 5}$$

The change in the rise time sum voltage $\Delta Vs_R$ associated with the rise time $\Delta t_R$ is calculated by subtracting the sum voltage at $t_{R1}$ from the sum voltage at $t_{R2}$. Similarly, the change in the fall time sum voltage $\Delta Vs_F$ associated with the fall time $\Delta t_F$ is calculated by subtracting the sum voltage at $t_{F2}$ from the sum voltage at $t_{F1}$.

It should be noted that if the same peak percentage points are used on both the rise and fall of the peak, the change in rise time sum voltage $\Delta Vs_R$ is the same as the change in fall time sum voltage $\Delta Vs_F$ and can simply be defined as $\Delta Vs$ (as shown). It should be understood, however, that if different peak percentage points are used, the change in rise time sum voltage $\Delta Vs_R$ and fall time sum voltage $\Delta Vs_F$ may differ.

The sum signal slew rate SSR for the rise time $\Delta t_R$ and fall time $\Delta t_F$ may be defined as follows:

$$SSR_1=\Delta t_R/\Delta Vs_R \qquad \text{eq. 6}$$

$$SSR_2=\Delta t_F/\Delta Vs_F \qquad \text{eq. 7}$$

Either of these sum signal slew rates can be used to calculate the coil gain as later described in detail. However, the sum signal slew rates $SSR_1$, $SSR_2$ may be averaged, filtered, regressed, etc. For example, the sum signal slew rates $SSR_1$, $SSR_2$ may be averaged to obtain a more accurate sum slew rate ("SSR") as follows:

$$SSR=(SSR_1+SSR_2)/2 \qquad \text{eq. 8}$$

Moreover, as the shape of the sum signal may vary, as previously discussed, it is also possible to obtain more than one sum signal and perform SSR determinations for each of these additional sum signals. In addition, as there may be a lag between the voice coil slew rate and the sum signal, error may be introduced in measuring the sum signal slew rate. This error, however, may be substantially negated by passing the point of optimum focus twice, i.e., once in the positive Z direction and once in the negative Z direction.

The coil gain can be calculated using the input voice coil slew rate previously discussed with respect to equation no. 3. As a result of knowing both the sum signal slew rate and the voice coil slew rate, the coil gain may be calculated using a constant k associated with the OPU used to move the lens.

The coil gain may be calculated as follows:

$$CG=(k)(1000\ \mu m/mm)(SSR)/(VCSR) \qquad \text{eq. 9}$$

For example, if an NEC 9100A optical pick-up unit having constant k of 2.54E-3 mm/V were used and the sum signal slew rate were calculated to be 2V/18.67 ms and if the input voice coil slew rate were 0.619 mV/ms, the coil gain would be:

$$CG=(2.54E\text{-}3mm/V)(1000\ \mu m/mm)(2V/18.67\ ms)/ \\ (0.619\ mV/ms) \qquad \text{eq. 10}$$

$$CG=0.4401\ \mu m/mV \qquad \text{eq. 11}$$

Therefore, according to equation 2, the coil voltage offset $\Delta V_{OS}$ would be determined from the Z-distance offset $Z_{OS}$ and the coil gain as follows:

$$\Delta V_{OS}=(Z_{OS})/CG \qquad \text{eq. 12}$$

If a Z-distance offset $Z_{OS}$ of $-30\ \mu m$ were desired, the coil voltage offset $\Delta V_{OS}$ would be decreased as follows:

$$\Delta V_{OS}=-30\ \mu m/(0.440\ \mu m/mV)=-68.18\ mV \qquad \text{eq. 13}$$

As a result, if the voltage $V_{OF}$ applied to the coil at the point of optimum focus were 1.0V, the voltage $V_{OS}$ applied at the offset Z-distance would be:

$$V_{OS}=V_{OF}-\Delta V_{OS}=1.0V-68.18\ mV=931.82\ mV \qquad \text{eq. 14}$$

In practice, the coil gain should be determined as printing progresses across the disc and the input voice coil voltage should be adjusted accordingly. Further, to enhance accuracy, multiple coil gain determinations may be made at each location the disc; the various coil gain results may be averaged, filtered, regressed, etc.

Figure 4:
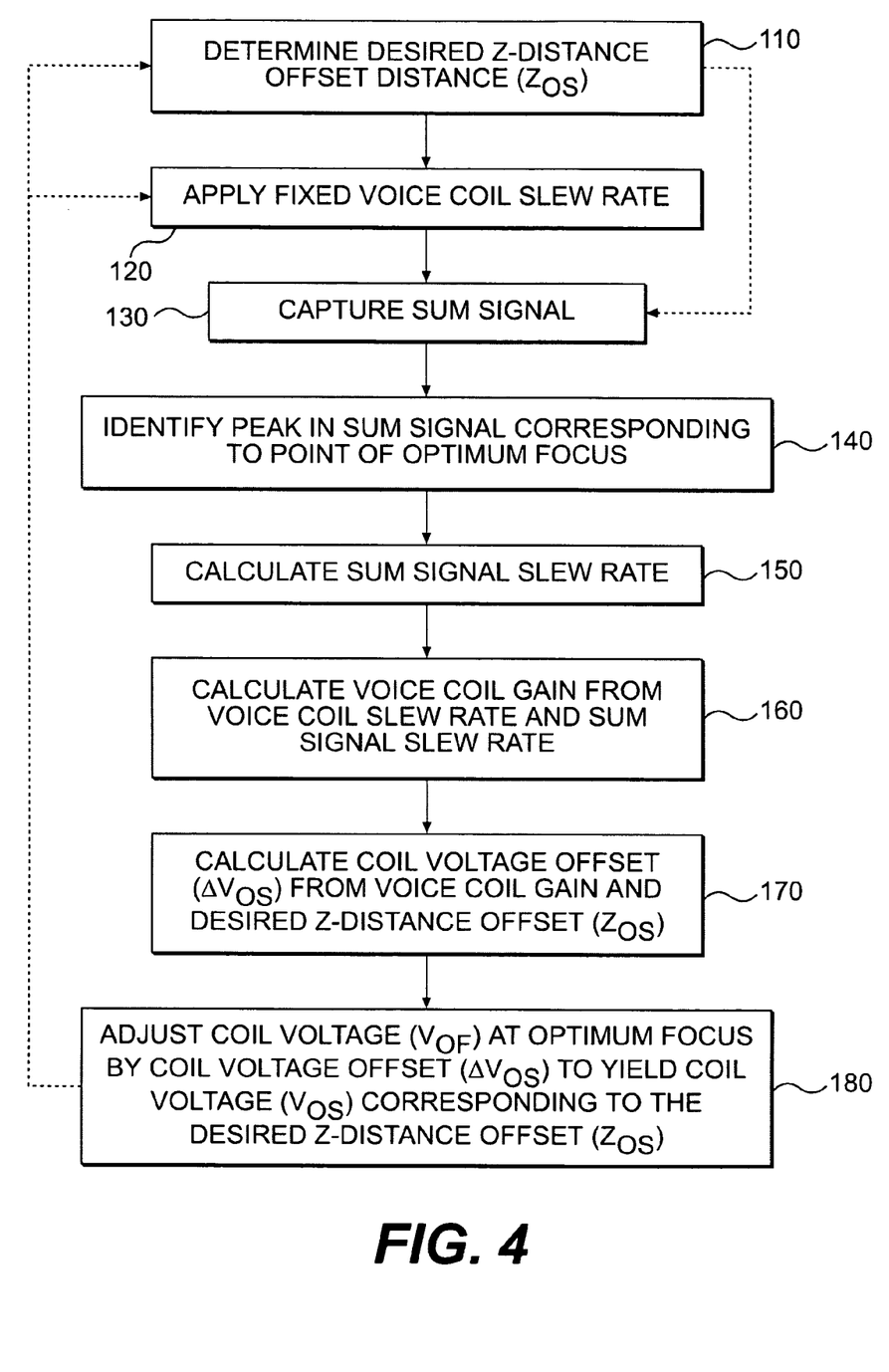
FIG. 4 is a schematic diagram of an embodiment of a method of calibrating the Z-distance of a lens, the method may be performed by a program product embodiment.

With respect to FIG. 4, a series of steps can be described as follows to calculate of the voice coil gain and the change in voltage offset $\Delta V_{OS}$ needed to move a lens to a predetermined Z-distance offset $Z_{OS}$. These steps, of course, would substantially be performed after the laser power is decreased so as to prevent marking on the disc.

In a first step 110, a desired Z-distance offset $Z_{OS}$ is predetermined. For example, if the initial Z-distance of the lens is defined as 0 μm, a Z-distance offset may be defined, for example, between about −80 μm (i.e., toward the disc) and about +20 μm (i.e., away from the disc). In step 120, which may be either after step 110 or simultaneous therewith, a substantially fixed voice coil slew rate is applied to the lens 230 (shown in FIG. 5) to move the lens 230 through vertical range which includes a Z-distance of optimum focus $Z_{OF}$. As the voice coil slew rate is applied to the lens, the sum signal versus time reflected by the disc to the sensor is monitored, as shown in step 130. Upon obtaining the sum signal, the peak corresponding to the Z-distance of optimum focus $Z_{OF}$ is identified in step 140. From the rise time and/or fall time of the peak in the sum signal, the sum signal slew rate may be calculated in step 150. In step 160, upon calculating the sum signal slew rate, the voice coil gain may be calculated using the input voice coil slew rate and the calculated sum signal slew rate. Once the voice coil gain is determined, the voice coil gain may be used along with the desired Z-distance offset $Z_{OS}$, to calculate the coil voltage offset $\Delta V_{OS}$, in step 170. Finally, in step 180, the coil voltage offset $\Delta V_{OS}$ may be applied to the coil voltage at optimum focus $V_{OF}$ to yield an offset coil voltage $V_{OS}$.

It should, of course, be understand that as this method may entail an iterative process for each location on a disc. As a result, upon setting the offset coil voltage $V_{OS}$ for a particular location on the disc, the process may be repeated (starting either at step 110 or at step 120) with another location on the disc.

Figure 5:
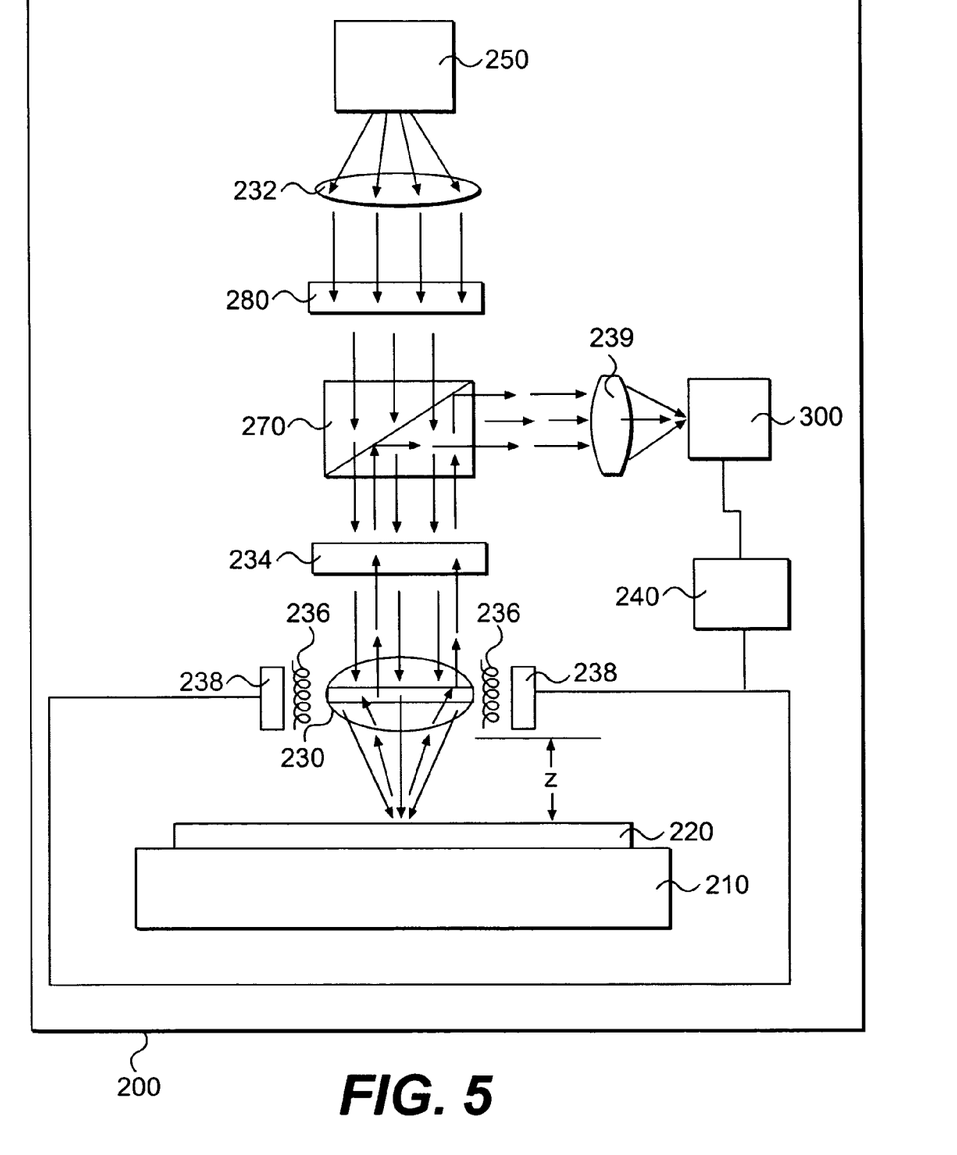
FIG. 5 is a schematic depiction of an embodiment of a CD drive comprising a disc tray, a lens, and an adjustment mechanism configured to adjust a Z-distance between a disc provided in the disc tray and the lens.

The aforementioned method may be comprised in a program product embodiment which, in turn, may be comprised in a CD drive, a DVD drive, or other optical (or non-optical) drive embodiment. For example, a microcontroller (which may be an adjustment mechanism 240, as shown in FIG. 5), comprising a programmed product, may control the radial and/or Z-distance movements of the lens 230 with respect to the disc 220. In addition, the microcontroller program product may also control the coil gain and/or Z-distance offset calculations (including averages, regressions, etc.) at each location on the disc as well as the number of samples from which these calculations are derived. In other words, a microcontroller may comprise a program product configured to perform the aforementioned Z-distance calibration method steps.

FIG. 5 is a schematic depiction of a CD drive, other optical drive, or similar laser imagible device (hereinafter "CD drive") 200 which is configured to perform the calibration method previously described. The drive 200 includes a tray 210 which is configured to hold a disc or other media (hereinafter "disc") 220. Light is emitted by a light source 250 (e.g., a laser diode) and reflects off the disc 220 and into the objective lens 230, as hereafter explained in detail.

For the lens 230 to focus the reflected light properly, the lens 230 must be properly spaced from the disc 220 by a proper Z-distance. The Z-distance, which is the space between the lens 230 and the disc 220, is adjusted according to the method previously described by controlling the voltage on the movable coils 236. The movable coils 236 move the lens 230 toward and away from the disk based on the voltage induced therein by stationary magnets 238.

With respect to FIG. 5, the light source 250 emits light as indicated by the directional arrows emanating therefrom. The light passes through a collimating lens 232 and through a diffraction grating 280. After passing through the diffraction grating 280, the light passes through a beam splitter 270 and then through a quarter wave plate 234; the quarter wave plate 234 changes the polarization of the light from linear to circular. After passing through the quarter wave plate 234, the light enters and passes through the objective lens 230.

The objective lens 230 focuses the light on a spot on the disc 220 which, in turn, reflects the light (as shown) back through the objective lens 230. The reflected light then passes back through the quarter wave plate 234 which reverts the light back to a linear polarization. After passing back through the quarter wave plate 234, the light is redirected by the beam splitter 270 toward a second lens 239 which focuses the light into a sensor 300. The sensor 300 generates the sum signal waveform previously discussed.

As a result of the sum signal, the coil gain can be determined according to the previously discussed method. In turn, the coil gain may be used with the Z-distance offset $Z_{OS}$, to calculate the coil voltage offset $\Delta V_{OS}$. An adjustment mechanism 240 may then adjust the magnets 238 so that the voltages induced in the coils 236 will be adjusted by the calculated coil voltage offset $\Delta V_{OS}$. As a result of the change in voltage induced in the coils 236, the objective lens 230 will move a distance (with respect to the disc 220) substantially equal to the Z-distance offset $Z_{OS}$.

In addition to performing the aforementioned coil gain calibrations, the adjustment mechanism 240 may adjust the Z-distance so that the lens is in substantially optimum focus or at a predetermined offset from optimum focus. Moreover, these calibrations may be performed at each location on the disc. For example, the adjustment mechanism 240 could adjust the Z-distance such that the lens 230 were between about −80 μm toward the disc and about +20 μm away from the disc, assuming 0 μm were the Z-distance corresponding to optimum focus. More specifically, the adjustment mechanism 240 could adjust the Z-distance such that the lens 230 were at about −30 μm.

Although the aforementioned describes embodiments of the invention, the invention is not so restricted. It will be apparent to those skilled in the art that various modifications and variations can be made to the disclosed embodiments of the present invention without departing from the scope or spirit of the invention. Accordingly, these other voice coil gain calibration systems and methods of adjusting the input voice coil voltage to attain a predetermined Z-distance offset are fully within the scope of the claimed invention. Therefore, it should be understood that the apparatus and method embodiments described herein are illustrative only and are not limiting upon the scope of the invention, which is indicated by the following claims.

What is claimed is:

1. A laser imagible apparatus comprising:
   a lens;
   a media tray; and
   an adjustment mechanism configured to determine a voice coil gain for substantially all locations on a media based on a sum signal at each location and an input voice coil slew rate.

2. The laser imagible apparatus according to claim 1, wherein the adjustment mechanism is also configured to adjust a distance between the lens and a media on the media tray in response to the voice coil gain determined at each location on the media.

3. The laser imagible apparatus according to claim 2, wherein the adjustment mechanism is configured to adjust the lens to be at a predetermined offset distance with respect to a distance corresponding to an optimum focus at substantially all locations on a media in the media tray.

4. A laser imagible apparatus comprising:
a lens;
a media tray; and
an adjustment mechanism configured to determine a voice coil gain for substantially all locations on a media in the media tray and, in response to the voice coil gain determined at each location on the media, to adjust a distance between the lens and the media to be at a predetermined offset distance with respect to a distance corresponding to an optimum focus, wherein if 0 μm is defined as the distance at which the lens is in optimum focus with respect to the media, the predetermined offset distance is between about 80 μm from the optimum focus distance toward the media and about 20 μm from the optimum focus distance away from the media from.

5. The laser imagible apparatus according to claim 4, wherein the predetermined offset distance is about 30 μm from the optimum focus distance toward the media.

6. An optical drive comprising:
a lens;
a disc tray;
means for determining a voice coil gain for substantially all locations on a disc in the disc tray; and
means for, in response to the voice coil gain determined at each location on the disc, adjusting a distance between the lens and the disc to be at a predetermined offset distance with respect to a distance corresponding to an optimum focus, wherein if 0 μm is defined as the distance at which the lens is in optimum focus with respect to the disc, the predetermined offset distance is between about 80 μm from the optimum focus distance toward the disc and about 20 μm from the optimum focus distance away from the disc.

7. The optical drive according to claim 6, wherein the predetermined offset distance is about 30 μm from the optimum focus distance toward the disc.

8. An optical drive comprising:
a lens;
a media holder; and
an adjustment mechanism configured to determine a voice coil gain for a location on a media in the media holder and to use the determined voice coil gain to adjust a distance between the lens and the media at the location to be at a predetermined offset distance with respect to a distance corresponding to an optimum focus, wherein if 0 μm is defined as the distance at which the lens is in optimum focus with respect to the media, the predetermined offset distance is between about 80 μm from the optimum focus distance toward the media and about 20 μm from the optimum focus distance away from the media.

9. The optical drive according to claim 8, wherein the adjustment mechanism is configured to determine a voice coil gain iteratively for each of substantially all locations on the media to adjust the distance between the lens and the media at each location.

10. An optical drive comprising:
a lens;
a media holder;
an adjustment mechanism for adjusting a distance between the lens and a media in the media holder, the adjustment mechanism configured to determine a voice coil gain for a location on the media based on a sum signal at the location and an input voice coil slew rate.

11. The optical drive according to claim 10, wherein the adjustment mechanism is configured to determine a voice coil gain iteratively for each of substantially all locations on the media based on a sum signal at each location and an input voice coil slew rate.

* * * * *

UNITED STATES PATENT AND TRADEMARK OFFICE
CERTIFICATE OF CORRECTION

PATENT NO.        : 7,315,493 B2
APPLICATION NO.   : 10/767192
DATED             : January 1, 2008
INVENTOR(S)       : Andrew L. Van Brocklin et al.

It is certified that error appears in the above-identified patent and that said Letters Patent is hereby corrected as shown below:

In column 4, line 49, equation 11, delete "$CG = 0.4401\ \mu m/mV$" and insert -- $CG = 0.440\ \mu m/mV$ --, therefor.

Signed and Sealed this

Fifth Day of August, 2008

JON W. DUDAS
*Director of the United States Patent and Trademark Office*